W. G. TEMPLETON.
SCALE.
APPLICATION FILED DEC. 16, 1907.

900,895.

Patented Oct. 13, 1908.
6 SHEETS—SHEET 3.

Witnesses
E. J. Stewart
O. Daniels

Inventor
William G. Templeton.
By C. A. Snow & Co
Attorneys

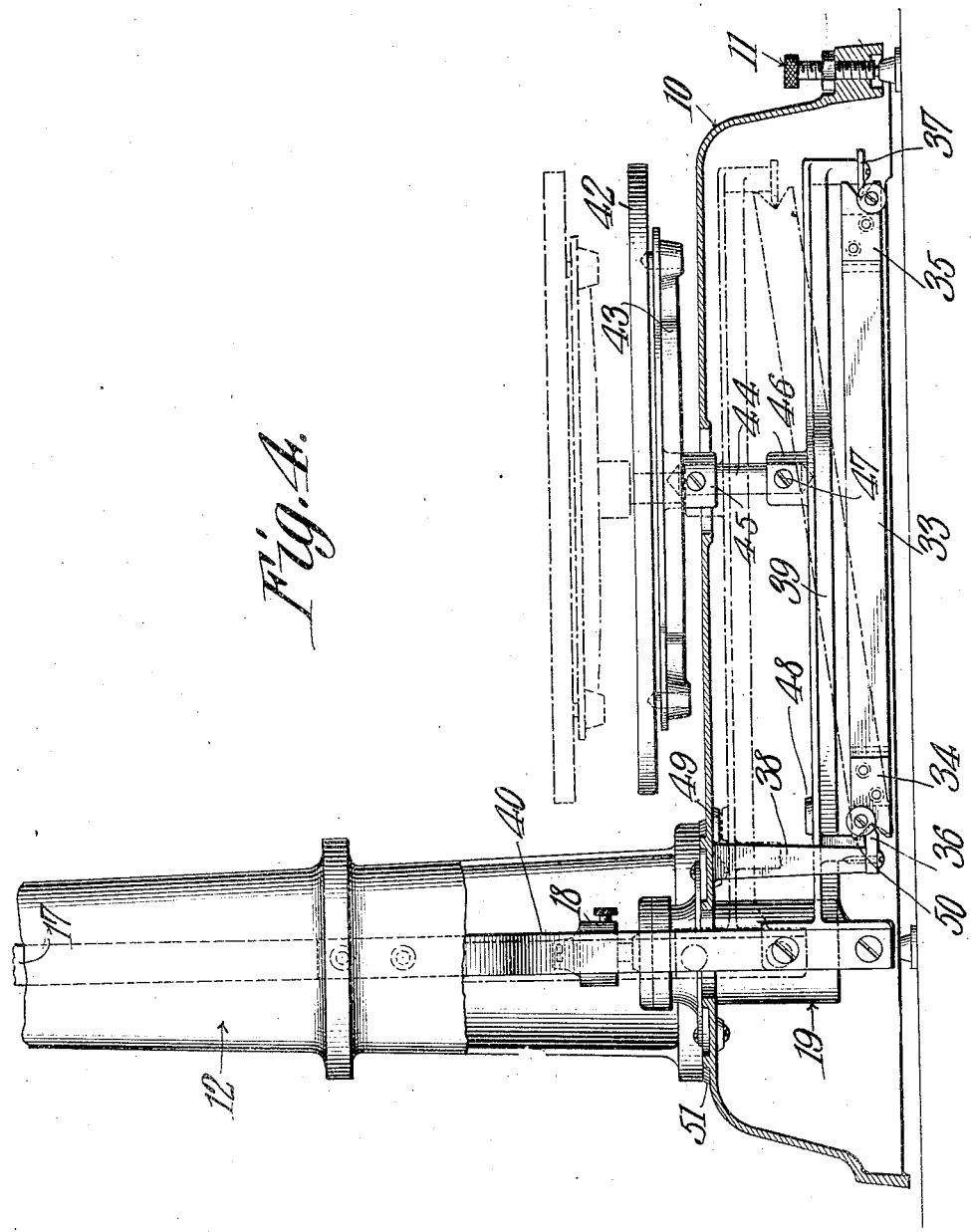

W. G. TEMPLETON.
SCALE.
APPLICATION FILED DEC. 16, 1907.

No. 900,895.

Patented Oct. 13, 1908.
6 SHEETS—SHEET 5.

Witnesses
E. J. Stewart
O. Daniels

William G. Templeton,
INVENTOR.

By C. A. Snow & Co.
Attorneys

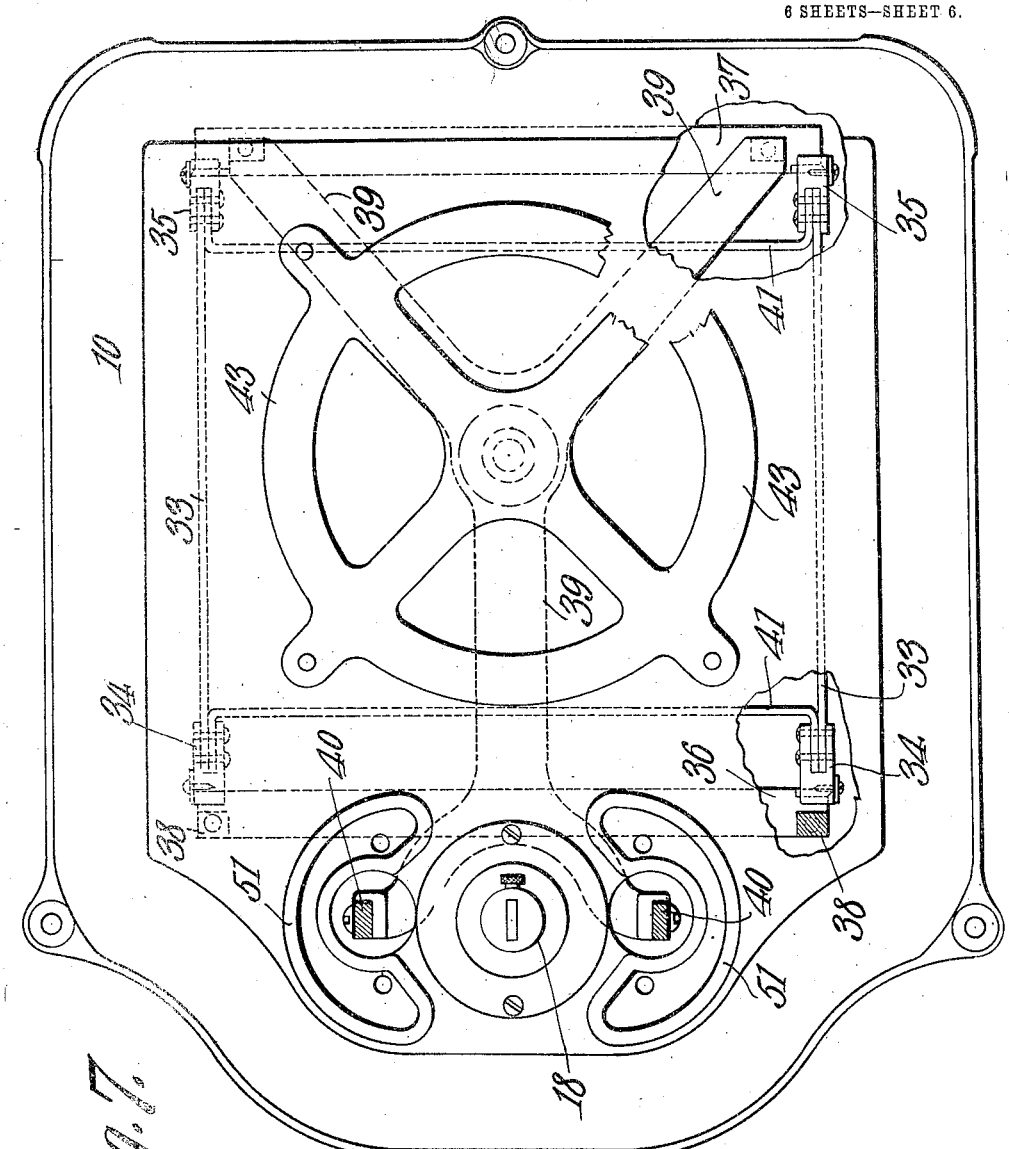

UNITED STATES PATENT OFFICE.

WILLIAM G. TEMPLETON, OF COLORADO SPRINGS, COLORADO.

SCALE.

No. 900,895.   Specification of Letters Patent.   Patented Oct. 13, 1908.

Application filed December 16, 1907. Serial No. 406,699.

*To all whom it may concern:*

Be it known that I, WILLIAM G. TEMPLETON, a citizen of the United States, residing at Colorado Springs, in the county of El Paso and State of Colorado, have invented a new and useful Scale, of which the following is a specification.

The invention relates to weighing scales of the computing or other type, wherein a sector shaped poise is employed, and is provided with designations indicating weight, price, or other computations, and the object in view is to provide an apparatus of this kind wherein the various operations incident to the manipulation thereof are facilitated to increase the general efficiency thereof, particularly with reference to the reading of the graduations or indications on the dial, and wherein the parts are so related and mounted as to insure accuracy in use.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit, or sacrificing any of the advantages of the invention.

Figure 1:
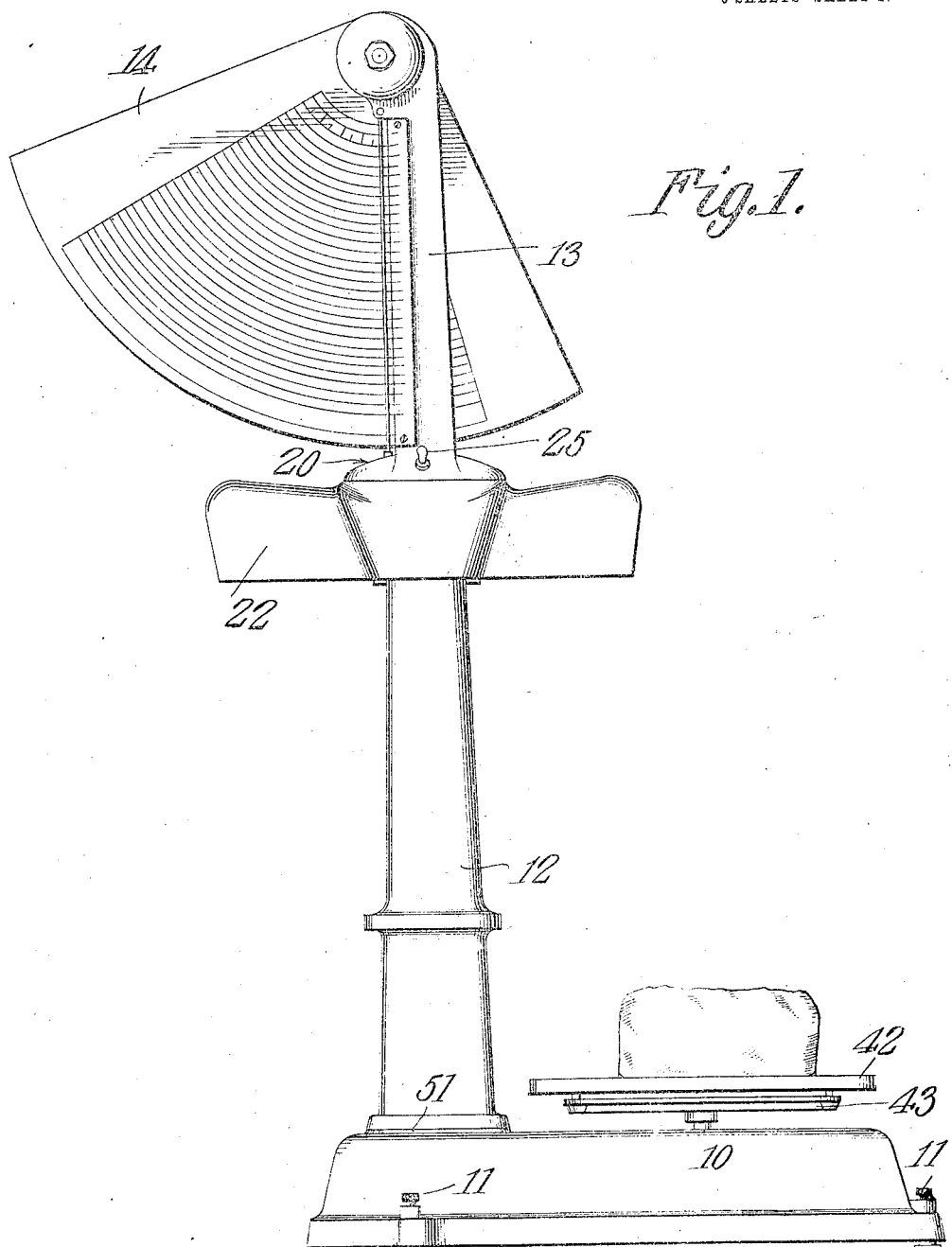
Figure 2:
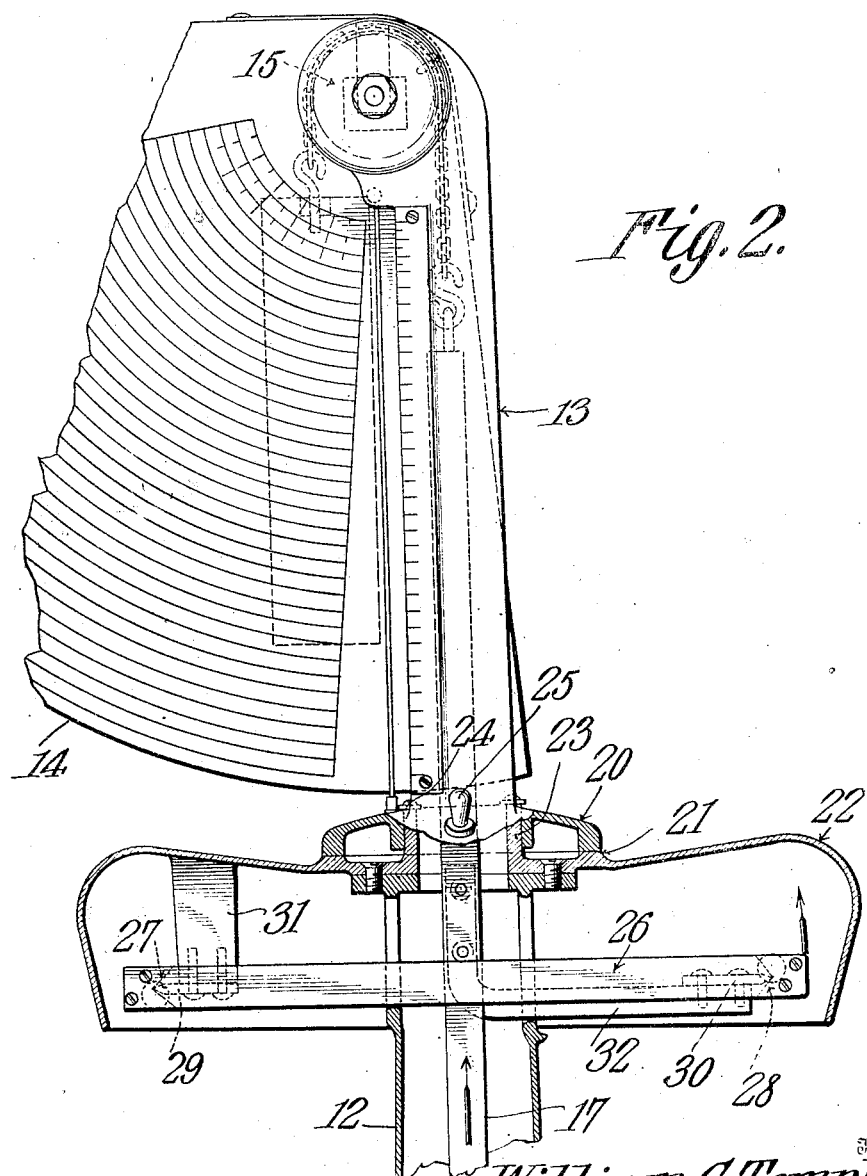
Figure 3:
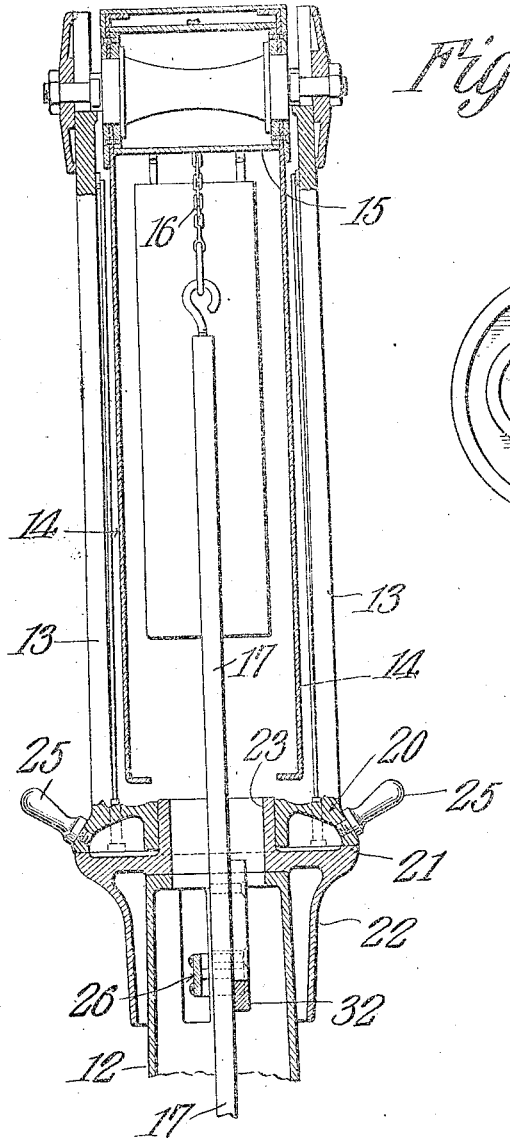
Figure 8:
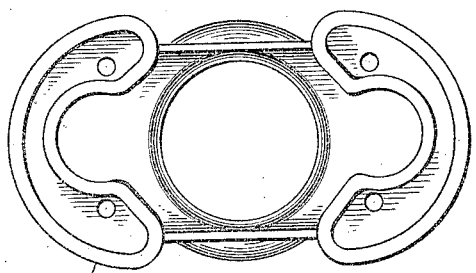
Figure 6:
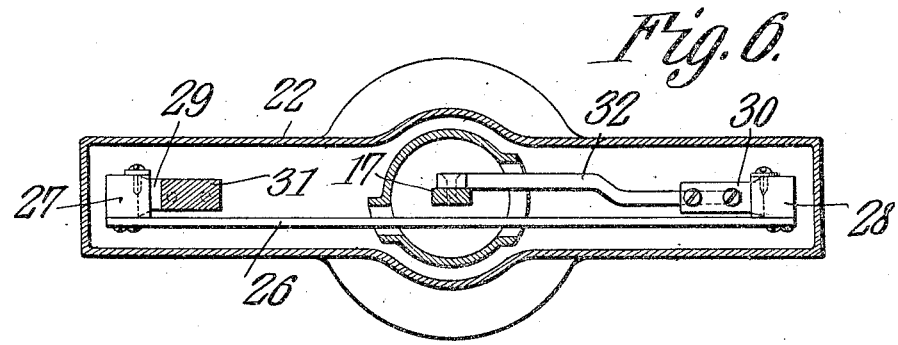
Figure 5:
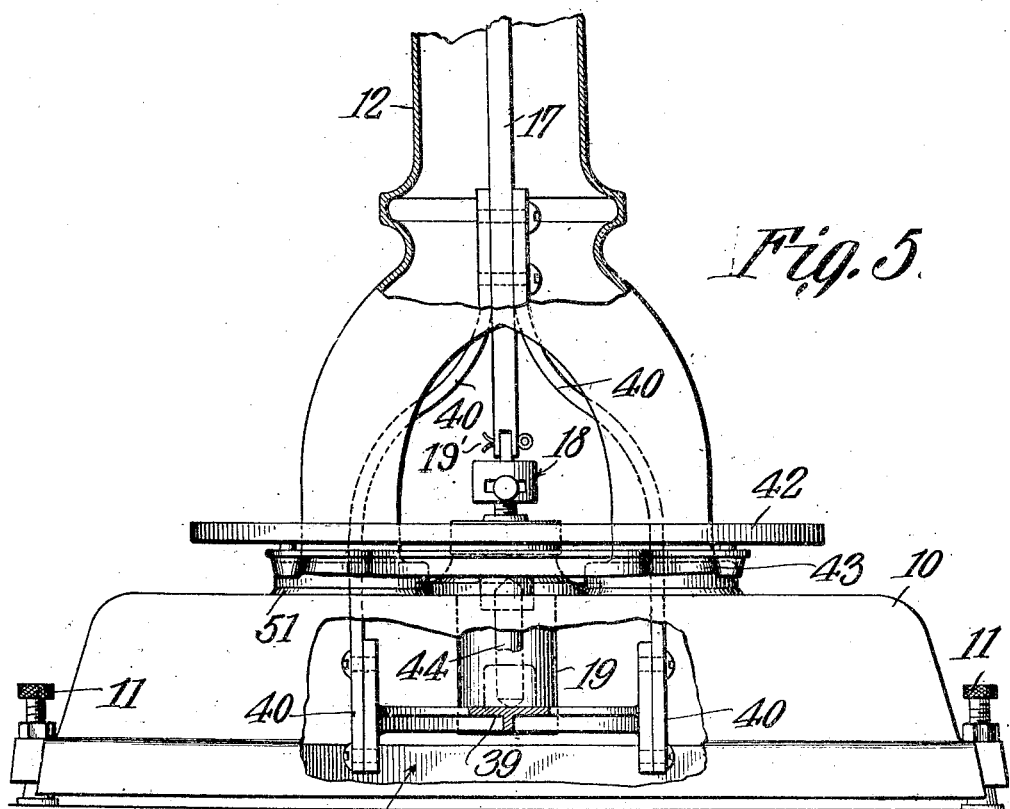

In the accompanying drawings:—Figure 1 is a view of a scale constructed in accordance with the present invention. Fig. 2 is a detail elevation, partly in section, of the upper portion of the scale, showing one of the equalizers for the load carrier. Fig. 3 is a vertical section, also, of the upper portion of the scale taken at right angles to the plane of Fig. 2. Fig. 4 is a longitudinal sectional view of the lower portion or base of the scale. Fig. 5 is a sectional view of the same taken at right angles to the plane of Fig. 4. Fig. 6 is a horizontal sectional view of the upper equalizing means for the load carrier. Fig. 7 is a plan view of the base and pan, a portion of the latter being broken away. Fig. 8 is an inverted plan view of the standard base.

Similar numerals of reference are employed to indicate corresponding parts throughout the several figures of the drawings.

In the construction illustrated, the scale consists essentially of a base 10 provided with beveling screws 11, a hollow standard 12, a divided stem 13, and a sector shaped poise 14, which swings between the planes of the spaced parts of the stem 13. Preferably, as illustrated, the poise consists of spaced members which are duplicates of each other, and are correspondingly graduated on their exposed or outer faces, so that the scale can be used from either side. The poise is carried by a drum 15 mounted in the members of the stem 13, and encircled by a flexible member 16, from which is supported the rod 17 of the load carrier, said rod 17 extending axially downward through the stem and standard and being attached to the plunger 18 of a dash pot 19 by a split pin 19'.

The stem 13 terminates at its lower end in a disk 20, seated on a bearing 21 formed on the upper side of a hood or casing 22, which, in turn, is supported by the standard 12, and encircles a thimble 23 upon which it is adapted to be turned to present the face, or either face, of the poise in position most convenient for reading by the operator. In practice, one or more retaining clips 24 may be attached to the thimble to prevent upward displacement of the stem and the disk forming the base of the stem may, as illustrated, be provided with grips or handles 25 to facilitate turning the same.

Within the casing 22 is arranged an equalizing device consisting of a bar 26 having terminal blocks 27 and 28, provided with V's, for the reception of the knife edges 29 and 30, the former of which is carried by a bracket 31 which is stationary and fixed to or integral with the frame, and the other of which is carried by an arm 32 extending laterally from the rod of the load carrier. This equalizer serves to eliminate vibration of the intermediate portion of the load receiver, and insure accurate vertical movement thereof in the weighing operation.

To perform the corresponding function at the lower portion of the load carrier, there are arranged within the base parallel equalizing bars 33 having terminal blocks 34 and 35 provided with V's for the reception of knife edges 36 and 37, the former of which is stationary and is carried by a bracket 38 depending from the upper wall of the base, and the other of which is carried by a frame 39 connected by straps 40 with the rod 17, whereby as the rod, and hence the frame 39, rise and fall in the operations of the scale, the equalizing bar 33 oscillates on the knife edges 36 and 37 to prevent lateral displacement or vibration It will be noted that the bar 33 is duplicated, the knife edges 36 and 37 extending transversely across the machine, and the bars 33 are transversely connected by braces 41 which thus combine with the equalizing bars to form what may be termed an equalizing frame. The frame 39 which may be termed the load carrier frame, is designed to support the scale pan or plate 42 supported by means of a spider 43 which is connected by a stem 44 with said load carrier frame, the extremities of the stem being fitted in sockets 45 and 46, respectively, of the spider, and the load carrier frame, and being there held by set screws 47. The upward movement of the load carrier frame is limited by the contact of buffers 48 and 49, respectively, carried by said frame, and the upper wall of the base and downward movement of the load carrier frame is limited by a stop 50 which is adapted at the limit of the downward movement of said frame to come into contact with a fixed part of the frame, such as the knife edge bar 36. The lower portion of the standard 12 is bifurcated to receive the dash pot 19, and the lugs thereof are arranged upon seats 51 on the base, said bifurcations of the standard being hollow to receive the straps 40 of the load carrier frame.

I claim:—

1. In a scale, the combination with a supporting frame, a load carrier, of a stem revolubly mounted upon the frame and having spaced members, weighing devices carried by the stem and connected with the load carrier, said weighing devices including a sectoral poise consisting of parallel members operating, respectively, in planes between the members of the stem.

2. In a weighing scale, the combination of a supporting frame and load carrier, said frame being provided with a hollow thimble, a stem having a disk revolubly fitted upon the thimble and consisting of spaced members, and a plural member sectoral poise mounted upon the stem to operate between the planes of the members thereof.

3. In a weighing scale, a hollow standard surmounted by a casing; a stem mounted on said casing; a drum mounted in the top of said stem; a sector shaped poise mounted on said drum; a load carrier rod flexibly suspended at its upper end from said drum, and extending downwards through the stem, casing, and standard; and an equalizing device in said casing, consisting of a fixed knife edge mounted on the casing; an arm mounted on the load carrier rod, with a knife edge at its end; and a bar disposed transversely to said rod, with a V at each end engaging the fixed knife edge, and the movable knife edge respectively.

4. In a weighing scale, a hollow standard surmounted by a casing; a stem mounted on said casing, a load carrier rod extending downwards through the stem, casing, and standard; an equalizing device in said casing, consisting of a fixed knife edge mounted on the casing, an arm mounted on the load carrier rod, with a knife edge at its end; and a bar disposed transversely to said rod with a V at each end engaging the fixed knife edge, and the movable knife edge respectively; a hollow base, a scale pan mounted on the base; a vertically movable frame located in the base, and mounted on the load carrier rod, and supporting the scale pan; said frame having knife edges; fixed knife edges mounted in the base; and an oscillating frame having V's which respectively engage the fixed knife edges, and the knife edges on the vertically movable frame.

In testimony that I claim the foregoing as my own, I have hereto affixed my signature in the presence of two witnesses.

WILLIAM G. TEMPLETON.

Witnesses:
JAS. M. WALKER,
M. C. ROBY.